United States Patent
Wu et al.

(10) Patent No.: US 11,862,622 B2
(45) Date of Patent: Jan. 2, 2024

(54) INTEGRATED CIRCUIT LAYOUT INCLUDING STANDARD CELLS OF DIFFERENT GATE LINE WIDTHS AND SAME GATE LINE PITCH

(71) Applicant: UNITED MICROELECTRONICS CORP., Hsin-Chu (TW)

(72) Inventors: Kun-Yuan Wu, Kaohsiung (TW); Wei-Jen Wang, Tainan (TW); Chien-Fu Chen, Miaoli County (TW); Chen-Hsien Hsu, Hsinchu County (TW); Chien-Hung Chen, Taipei (TW); Chun-Hsien Lin, Tainan (TW)

(73) Assignee: UNITED MICROELECTRONICS CORP., Hsin-Chu (TW)

( * ) Notice: Subject to any disclaimer, the term of this patent is extended or adjusted under 35 U.S.C. 154(b) by 203 days.

(21) Appl. No.: 17/348,784

(22) Filed: Jun. 16, 2021

(65) Prior Publication Data
US 2022/0344321 A1     Oct. 27, 2022

(30) Foreign Application Priority Data

Apr. 26, 2021    (CN) .......................... 202110453740.0

(51) Int. Cl.
*H01L 27/02*    (2006.01)
*H03K 19/20*    (2006.01)

(52) U.S. Cl.
CPC .......... *H01L 27/0207* (2013.01); *H03K 19/20* (2013.01)

(58) Field of Classification Search
CPC ..... H01L 27/0207; H03K 19/20; G06F 30/39; G06F 2117/12; G06F 2119/20; G06F 30/392
See application file for complete search history.

(56) References Cited

U.S. PATENT DOCUMENTS

| | | |
|---|---|---|
| 7,932,566 B2 | 4/2011 | Hou |
| 8,739,104 B1 | 5/2014 | Penzes |
| 8,756,550 B2 | 6/2014 | Blatchford |
| 8,943,455 B2 | 1/2015 | Chen |
| 2006/0136848 A1 | 6/2006 | Ichiryu |
| 2010/0164614 A1* | 7/2010 | Hou .................... H01L 27/0207 327/565 |

(Continued)

OTHER PUBLICATIONS

David Harris, Introduction to CMOS VLSI Design (E158), Lecture 9: Cell Design, pp. 1-43, XP055918295, Dec. 31, 2001.

*Primary Examiner* — Brian Turner
*Assistant Examiner* — Zhijun Xu
(74) *Attorney, Agent, or Firm* — Winston Hsu (57) ABSTRACT

An integrated circuit layout includes a first standard cell and a second standard cell. The first standard cell includes first gate lines arranged along a first direction and extending along a second direction. The second standard cell abuts to one side of the first standard cell along the second direction and includes second gate lines arranged along the first direction and extending along the second direction. A first gate line width of the first gate lines and a second gate line width of the second gate lines are different. A first cell width of the first standard cell and a second cell width of the second standard cell are integral multiples of a default gate line pitch of the first gate lines and the second gate lines. At least some of the second gate lines and at least some of the first gate lines are aligned along the second direction.

17 Claims, 8 Drawing Sheets

(56) References Cited

U.S. PATENT DOCUMENTS

| | | | |
|---|---|---|---|
| 2011/0227133 A1* | 9/2011 | Morimoto | H01L 27/11807 |
| | | | 257/E29.007 |
| 2017/0039311 A1* | 2/2017 | Wu | H01L 27/0207 |
| 2017/0244394 A1* | 8/2017 | Kim | H01L 27/0207 |
| 2022/0320068 A1* | 10/2022 | Yadoguchi | H01L 27/11807 |

* cited by examiner

INTEGRATED CIRCUIT LAYOUT INCLUDING STANDARD CELLS OF DIFFERENT GATE LINE WIDTHS AND SAME GATE LINE PITCH

BACKGROUND OF THE INVENTION

1. Field of the Invention

The present invention relates to an integrated circuit layout. More particularly, the present invention relates to an integrated circuit including standard cells having a same gate line pitch but different gate line widths.

2. Description of the Prior Art

As the needs for a better performance and various applications are increased, the integrated circuits (ICs) has become more and more complicated, and usually includes hundreds of thousands or millions of logic gates. In the industry, to facilitate circuit design process, circuit units of specific functions often used in an integrated circuit are usually designed into standard cells with logic gates, such as NAND cells, NOR cells, d-flip-flop cells, latch cells, I/O cells, OP amplifier cells, ADC cells, DAC cells. After verifying the manufacturability for mass production of the standard cells, standard cell libraries including the standard cells are licensed to the chip designer and may be arranged to produce certain functions of an integrated circuit by utilizing automated computer-aided design (CAD) tools such as logic simulator, logic synthesizer, and automatic placer & router. In this way, a complex and large integrated circuit may be correctly constructed within a short period of time.

In order to provide larger design flexibility, a standard cell library of a certain function usually includes standard cells having different gate line widths for providing different speeds or powers. The standard cells may be mix used by the designer to obtain desire performance. However, if the dimensions of these standard cells are not well designed, mix using the standard cells may produce unused blank areas in the layout, resulting in a waste of space. It may also reduce the efficiency of the automated layout process due to the increasing complexity of the patterns and routing. Furthermore, during the layout correction process such as an optical proximity correction (OPC) performed after the designed circuit layout being delivered to the foundry (tape-out), the increased pattern complexity may cause serious burden to the correction process, and wrong patterns may be more likely generated.

SUMMARY OF THE INVENTION

The present invention is directed to provide an integrated circuit layout including standard cells having a same gate line pitch but different gate line widths.

According to an embodiment of the present invention, an integrated circuit layout includes a first standard cell and a second standard cell. The first standard cell comprises two first cell boundaries arranged in parallel in a first direction and extending along a second direction, and a plurality of first gate lines between the two first cell boundaries and arranged along the first direction. The first direction and the second direction are perpendicular. The first gate lines respectively comprise a first gate line width and are distanced from each other by a default gate line pitch. The second standard cell abuts to a side of the first standard cell along the second direction and comprises two second cell boundaries arranged in parallel in the first direction and extending along the second direction, and a plurality of second gate lines between the two second cell boundaries and arranged along the first direction. The second gate lines respectively comprise a second gate line width and are distanced from each other by the default gate line pitch. The first gate line width and the second gate line width are different A first cell width between the two first cell boundaries and a second cell width between the two second cell boundaries are integral multiples of the default gate line pitch. At least some of the second gate lines and at least some of the first gate lines are aligned along the second direction.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The accompanying drawings are schematic drawings and included to provide a further understanding of the embodiments, and are incorporated in and constitute a part of this specification. The drawings illustrate some of the embodiments and, together with the description, serve to explain their principles. Relative dimensions and proportions of parts of the drawings have been shown exaggerated or reduced in size and are not necessarily drawn to scale, for the sake of clarity and convenience in the drawings. The same reference signs are generally used to refer to corresponding or similar features in modified and different embodiments.

DETAILED DESCRIPTION

To provide a better understanding of the present invention to those of ordinary skill in the art, several exemplary embodiments of the present invention will be detailed as follows, with reference to the accompanying drawings using numbered elements to elaborate the contents and effects to be achieved. The accompanying drawings are included to provide a further understanding of the embodiments, and are incorporated in and constitute a part of this specification. These embodiments are described in sufficient detail to enable those skilled in the art to practice the invention. Other embodiments may be utilized and that structural, logical and electrical changes may be made without departing from the spirit and scope of the present invention.

Figure 1:
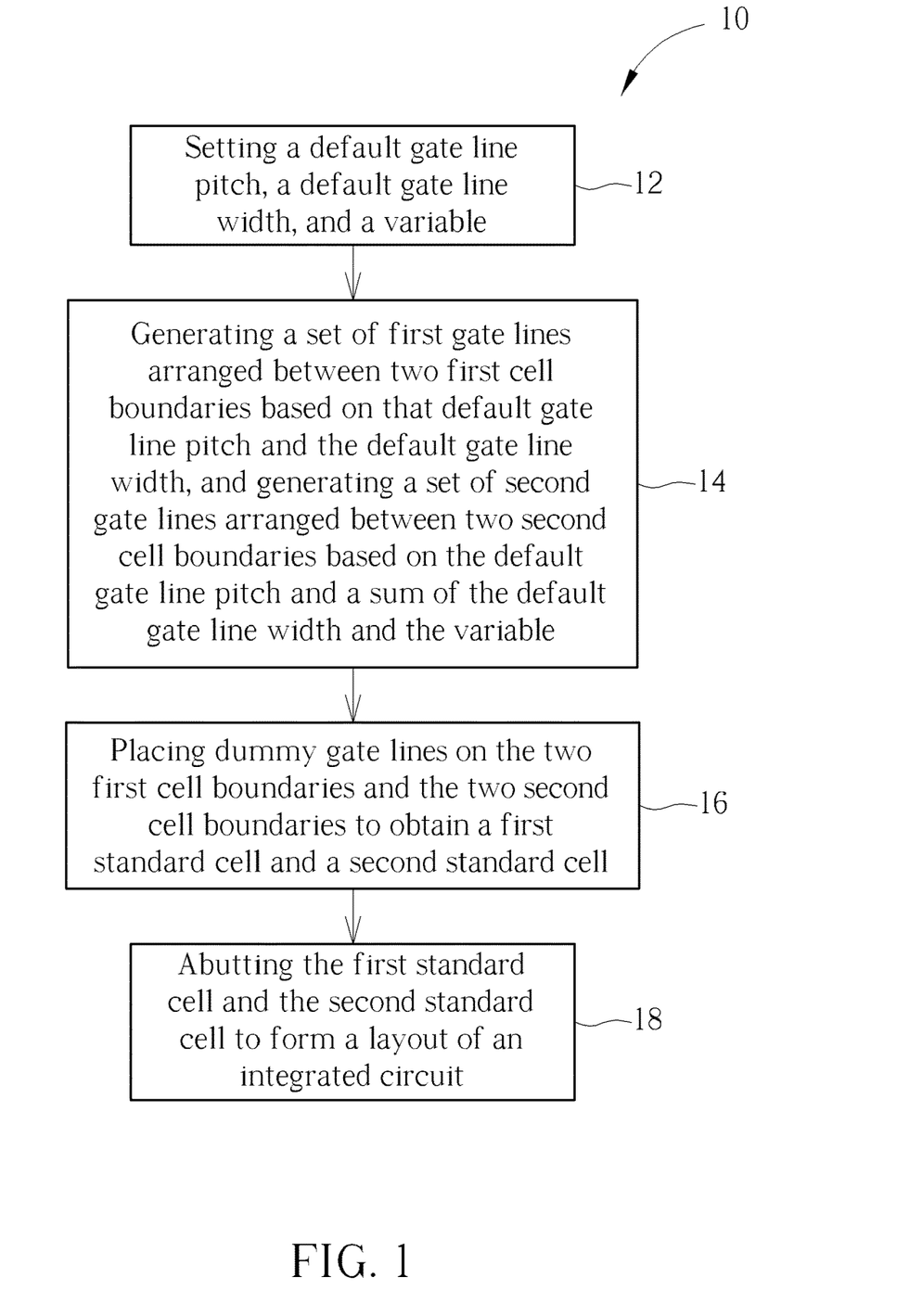
FIG. 1 shows a flow chart of a method for forming an integrated circuit layout according to one embodiment of the present invention.

FIG. 1 shows a flow chart of a method 10 for forming an integrated circuit layout according to one embodiment of the present invention. The method 10 may be performed by using any kind of computer system, such as a personal computer, portable computer, workstation, computer terminal, network computer, or any suitable data processing system or device.

As shown in FIG. 1, the method 10 for forming an integrated circuit layout provided by the present invention includes performing step 12, setting a default gate line pitch (the default gate line pitch P), a default gate line width (the default gate line width L), and a variable (for example, the first variable d1).

Following, step 14 is performed, which includes generating a plurality (a set) of first gate lines arranged between two first cell boundaries based on that default gate line pitch and the default gate line width, and generating a plurality (a set) of second gate lines arranged between two second cell boundaries based on the default gate line pitch and a sum of the default gate line width and the variable.

Following, step 16 is performed, which includes placing dummy gate lines on the two first cell boundaries and the two second cell boundaries to obtain a first standard cell and a second standard cell.

According to an embodiment of the present invention, the step 12 may further include setting another variable (for example, the second variable d2), and the step 14 may further include generating a plurality (a set) of third gate lines arranged between two third cell boundaries based on the default gate line pitch and a sum of the default gate line width and the another variable (for example, the second variable d2). The step 16 may further include placing dummy gate lines on the two third cell boundaries to form a third standard cell. It should be understood that other variables may be set in step 12 for forming standard cells based on the default gate line pitch and the other variables according to design needs.

Figure 2:
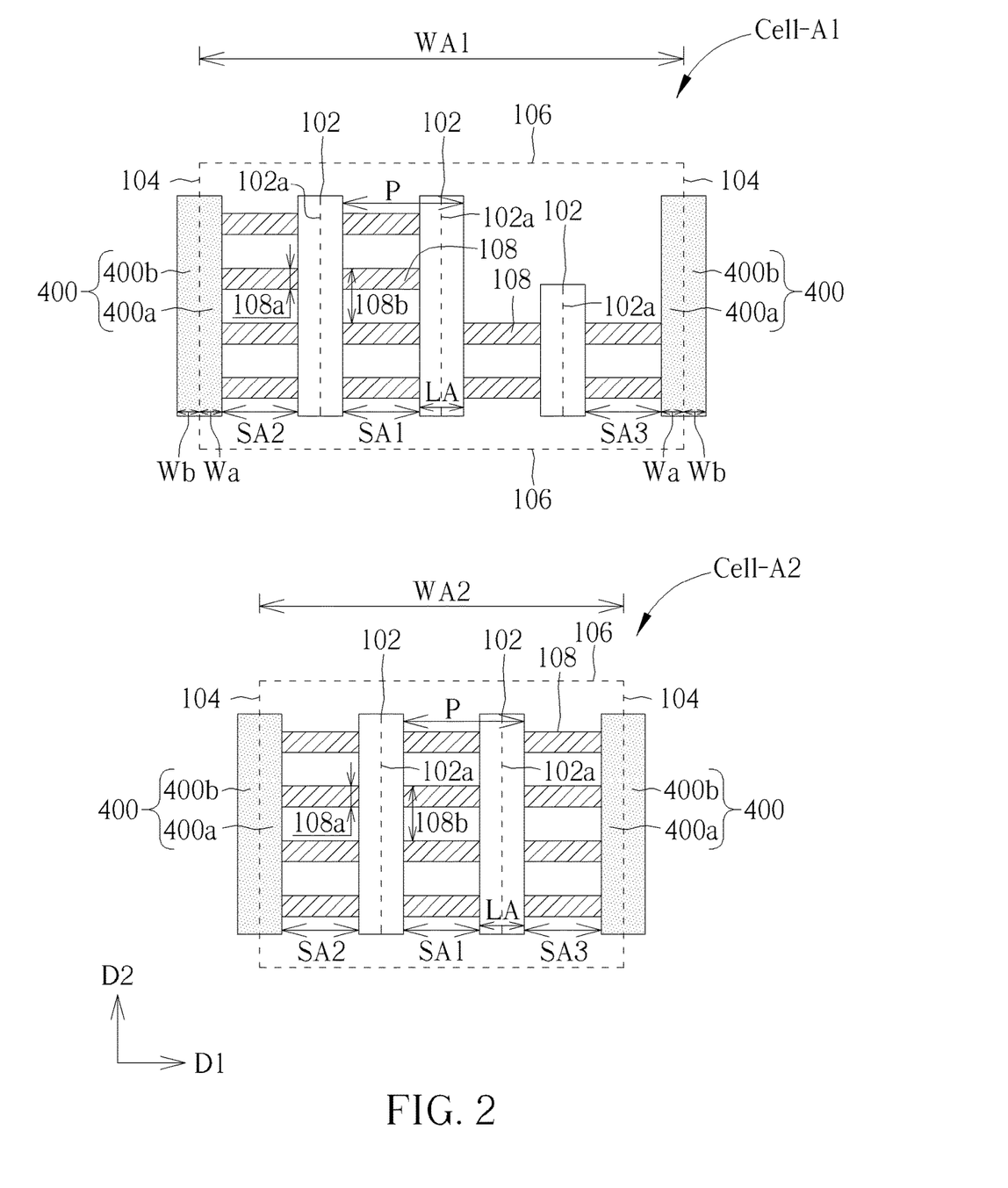
FIG. 2 to FIG. 4 are schematic drawings showing some exemplary standard cells according to some embodiment of the present invention.
Figure 3:
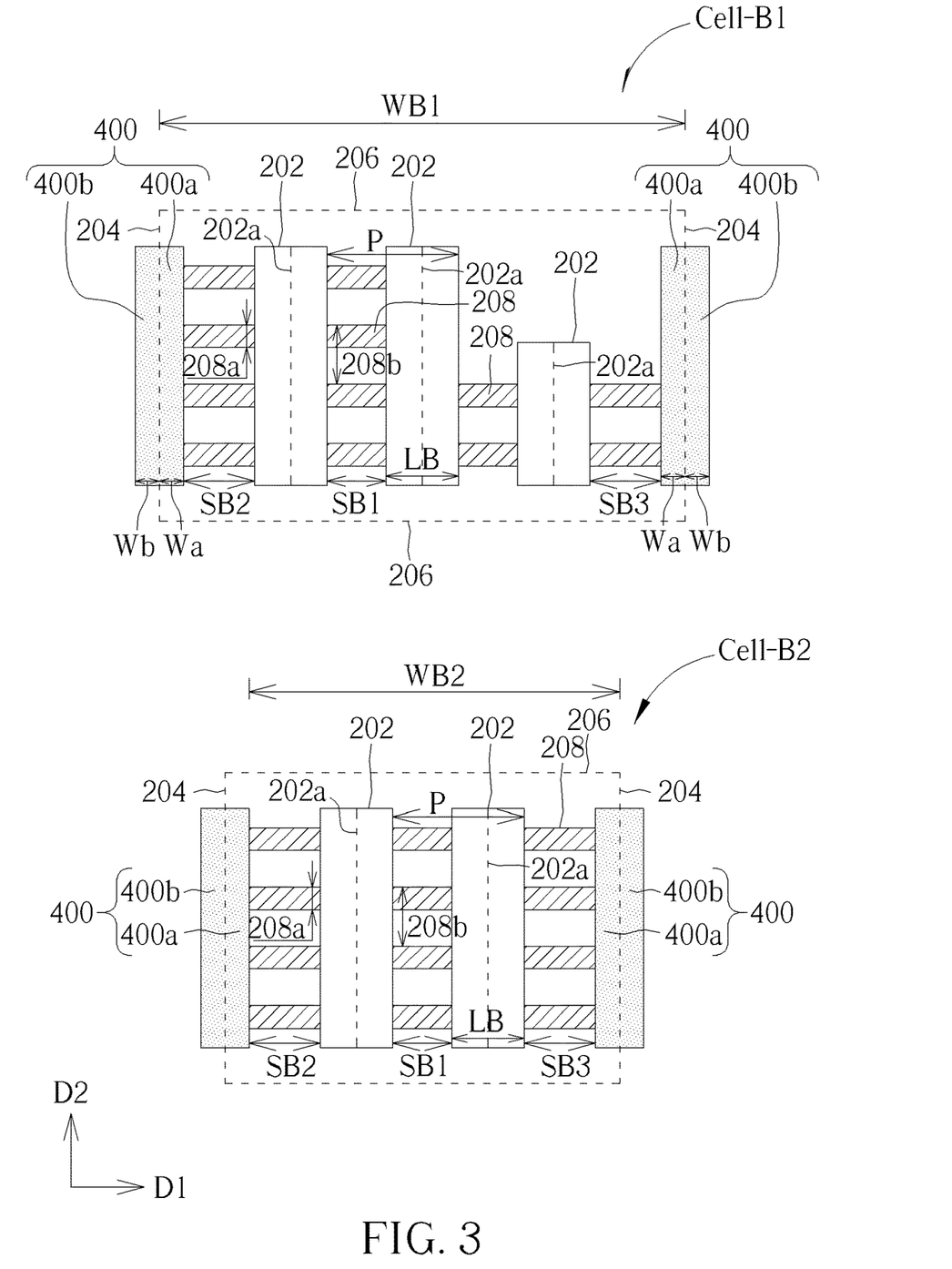
Figure 4:
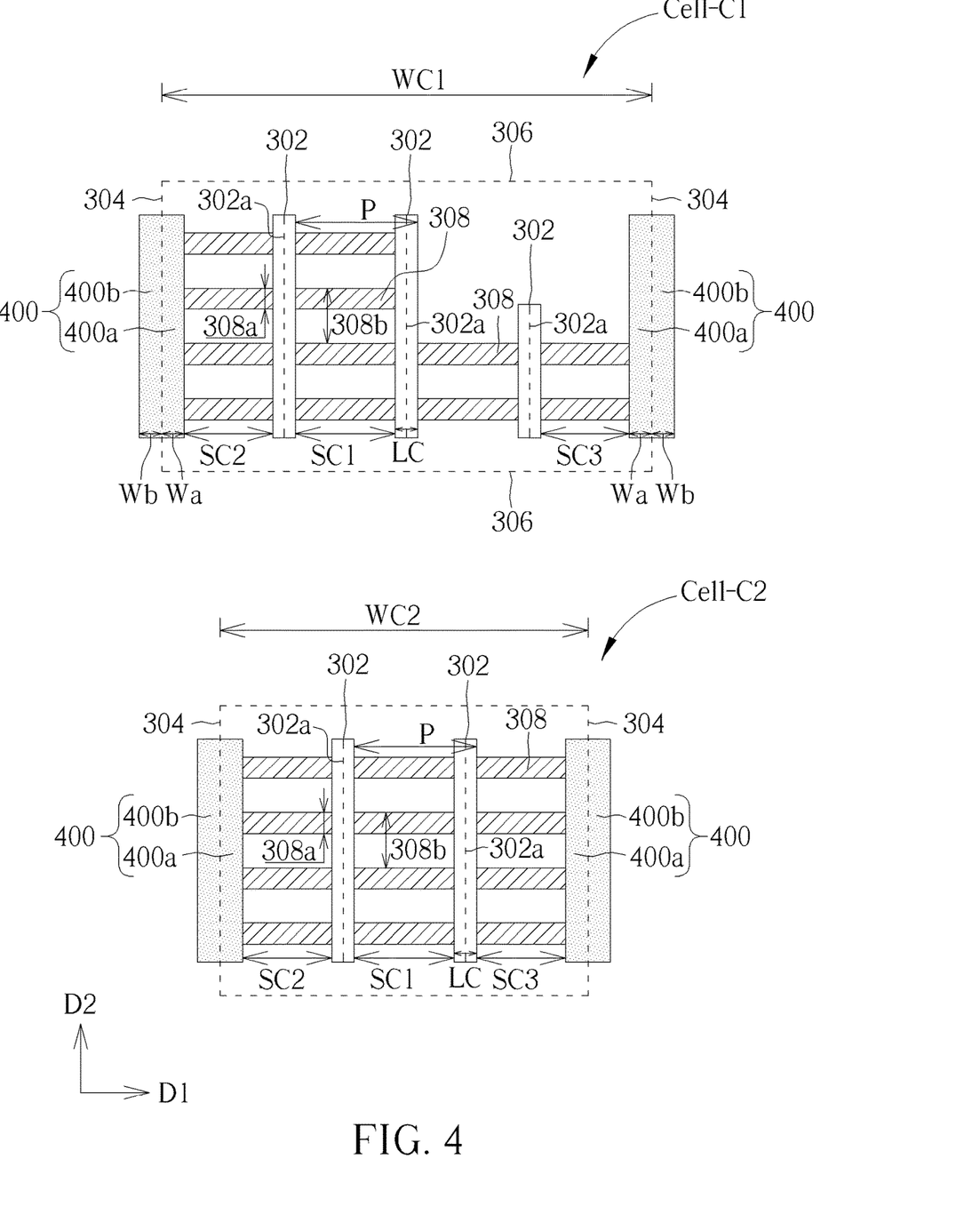

Please refer to FIG. 2, FIG. 3, and FIG. 4, which are schematic drawings showing some exemplary standard cells obtained by the method 10 shown in FIG. 1. It should be noted that in each drawing, the standard cell shown in the upper portion and the standard cell shown in the lower portion have the same gate line pitch (the default gate line pitch P) and the same gate line width (the default gate line width L), but have different circuit designs for providing different functions. The standard cells shown in the upper portions of FIG. 2, FIG. 3, and FIG. 4 have the same circuit design and function and the same gate line pitch (the default gate line pitch P), but have different gate line widths (the default gate line width L, a sum of the default gate line width L and the first variable d1, a sum of the default gate line width L and the second variable d2) for providing different speeds or powers. It should be noted that the layouts of the standard cells shown in FIG. 2, FIG. 3, and FIG. 4 are only examples, and the numbers of the gate lines, active region patterns are for the purpose of drawing and illustration, and should not be taken as limitation to the present invention. The present invention may be applied to standard cells that include a plurality of gate lines.

In detail, the standard cell Cell-A1 and the standard cell Cell-A2 shown in FIG. 2 respectively include a pair of cell boundaries 104 that extend along a second direction D2 and are parallel to each other, a pair of cell boundaries 106 that extend along a first direction D1 perpendicular to the second direction D2 and are parallel to each other, a plurality of active region patterns 108 that extend along the first direction D1 and are arranged in parallel along the second direction D2, a plurality of gate lines 102 that extend along the second direction D2 and are arranged along the first direction D1 between the two cell boundaries 104, and two dummy gate lines 400 that are overlapped with the cell boundaries 104 and are respectively distanced from the gate lines 102 by a dummy gate line space SA2 and a dummy gate line space SA3 between the edges of the dummy gate lines 400 and the edges of the adjacent gate lines 102. According to an embodiment of the present invention, as shown in FIG. 2, the distal ends of the active region patterns 108 are overlapped by the gate lines 102 or the dummy gate lines 400 and are not exposed. The gate lines 102 of the standard cell Cell-A1 and the standard cell Cell-A2 respectively have a gate line width LA and are distanced from each other by a default gate line pitch P. The default gate line pitch P is the sum of the gate line width LA and a gate line space SA1 between the edges of two adjacent gate lines 102. The active region patterns 108 of the standard cell Cell-A1 and the standard cell Cell-A2 have an active region width 108a and are distanced from each other by an active region pitch 108b. It is noteworthy that a cell width WA1 of the standard cell Cell-A1 between the cell boundaries 104 of the standard cell Cell-A1 and a cell width WA2 of the standard cell Cell-A2 between the cell boundaries 104 of the standard cell Cell-A2 are respectively integral multiples of the default gate line pitch P. The gate lines 102 of the standard cell Cell-A1 are arranged between the cell boundaries 104 in a way that the cell width WA1 may be divided into equal portions by the gate lines 102. The gate lines 102 of the standard cell Cell-A2 are arranged between the cell boundaries 104 in a way that the cell width WA2 may be divided into equal portions by the gate lines 102. In other words, along the center lines 102a of the gate lines 102, the standard cell Cell-A1 and the standard cell Cell-A2 may be divided into portions having the same width. It is also noteworthy that the cell boundaries 104 are substantially along the center lines of the dummy gate lines 400, so that the dummy gate lines 400 are respectively divided into two half portions 400a and 400b by the cell boundaries 104, wherein the half portion 400a has a half width Wa, the half portion 400b has a half width Wb, and the half width Wa and the half width Wb are the same. According to the above limitations, the dummy gate line space SA2 and the dummy gate line space SA3 may be the same, and the distances between the cell boundaries 104 and may be the same.

As shown in FIG. 3, the standard cell Cell-B1 and the standard cell Cell-B2 respectively include a pair of cell boundaries 204 that extend along the second direction D2 and are parallel to each other, a pair of cell boundaries 206 that extend along the first direction D1 and are parallel to each other, a plurality of active region patterns 208 that extend along the first direction D1 and are arranged in parallel along the second direction D2, a plurality of gate lines 202 that extend along the second direction D2 and are arranged along the first direction D1 between the two cell boundaries 204. According to an embodiment of the present invention, the standard cell Cell-B1 and the standard cell Cell-B2 as shown in FIG. 3 may have the dummy gate lines 400 the same as that of the standard cell Cell-A1 and the standard cell Cell-A2 shown in FIG. 2. The cell boundaries 204 of the standard cell Cell-B1 and the standard cell Cell-B2 are overlapped with the dummy gate lines 400, and the dummy gate lines 400 are distanced from the adjacent gate lines 202 by a dummy gate line space SB2 and a dummy gate line space SB3 between the edges of the dummy gate lines 400 and the edges of the adjacent gate lines 202. The distal ends of the active region patterns 208 are overlapped by the gate lines 202 or the dummy gate lines 400 and are not exposed. The gate lines 202 of the standard cell Cell-B1 and the standard cell Cell-B2 respectively have a gate line width LB and are distanced from each other by a default gate line pitch P, wherein the gate line width LB is different from the gate line width LA, and the default gate line pitch P is the sum of the gate line width LB and a gate line space SB1 between the edges of two adjacent gate lines 202. The active region patterns 208 of the standard cell Cell-B1 and the standard cell Cell-B2 respectively have an active region width 208a and are distanced from each other by an active region pitch 208b. According to an embodiment of the present invention, the active region width 208a is the same as the active region width 108a, and the active region pitch 208b is the same as the active region pitch 108b. It is noteworthy that a cell width WB1 of the standard cell Cell-B1 between the cell boundaries 204 of the standard cell Cell-B1 and a cell width WB2 of the standard cell Cell-B2 between the cell boundaries 204 of the standard cell Cell-B2 are respectively integral multiples of the default gate line pitch P. The gate lines 202 of the standard cell Cell-B1 are arranged between the cell boundaries 204 in a way that the cell width WB1 may be divided into equal portions by the gate lines 202. The gate lines 202 of the standard cell Cell-B2 are arranged between the cell boundaries 204 in a way that the cell width WB2 may be divided into equal portions by the gate lines 202. In other words, along the center lines 202a of the gate lines 202, the standard cell Cell-B1 and the standard cell Cell-B2 may be divided into portions having the same width. It is also noteworthy that the cell boundaries 204 are substantially along the center lines of the dummy gate lines 400, so that the dummy gate lines 400 of the standard cell Cell-B1 and the standard cell Cell-B2 are respectively divided into two half portions 400a and 400b by the cell boundaries 204, wherein the half portion 400a has a half width Wa, the half portion 400b has a half width Wb, and the half width Wa and the half width Wb are the same. According to the above limitations, it should be understood that the dummy gate line space SB2 and the dummy gate line space SB3 may be the same, and the distances between the cell boundaries 204 and the same.

As shown in FIG. 4, the standard cell Cell-C1 and the standard cell Cell-C2 respectively include a pair of cell boundaries 304 that extend along the second direction D2 and are parallel to each other, a pair of cell boundaries 306 that extend along the first direction D1 and are parallel to each other, a plurality of active region patterns 308 that extend along the first direction D1 and are arranged in parallel along the second direction D2, a plurality of gate lines 302 that extend along the second direction D2 and are arranged along the first direction D1 between the two cell boundaries 304. According to an embodiment of the present invention, the standard cell Cell-C1 and the standard cell Cell-C2 shown in FIG. 4 may have the dummy gate lines 400 the same as that of the standard cell Cell-B1 and the standard cell Cell-B2 shown in FIG. 3 and the standard cell Cell-A1 and the standard cell Cell-A2 shown in FIG. 2. The cell boundaries 304 of the standard cell Cell-C1 and the standard cell Cell-C2 are overlapped with the dummy gate lines 400, and the dummy gate lines 400 are distanced from the adjacent gate lines 302 by a dummy gate line space SC2 and a dummy gate line space SC3 between the edges of the dummy gate lines 400 and the edges of the adjacent gate lines 302. The distal ends of the active region patterns 308 are overlapped by the gate lines 302 or the dummy gate lines 400 and are not exposed. The gate lines 302 of the standard cell Cell-C1 and the standard cell Cell-C2 respectively have a gate line width LC and are distanced from each other by a default gate line pitch P, wherein the gate line width LC is different from the gate line width LA and the gate line width LB, and the default gate line pitch P is the sum of the gate line width LC and a gate line space SC1 between the edges of two adjacent gate lines 302. The active region patterns 308 of the standard cell Cell-C1 and the standard cell Cell-C2 respectively have an active region width 308a and are distanced from each other by an active region pitch 308b. According to an embodiment of the present invention, the active region width 108a, the active region width 128a, and the active region width 308a are the same; the active region pitch 108b, the active region pitch 208b, and the active region pitch 308b are the same. It is noteworthy that a cell width WC1 of the standard cell Cell-C1 between the cell boundaries 304 of the standard cell Cell-C1 and a cell width WC2 of the standard cell Cell-C2 between the cell boundaries 304 of the standard cell Cell-C2 are respectively integral multiples of the default gate line pitch P. The gate lines 302 of the standard cell Cell-C1 are arranged between the cell boundaries 304 in a way that the cell width WC1 may be divided into equal portions by the gate lines 302. The gate lines 302 of the standard cell Cell-C2 are arranged between the cell boundaries 304 in a way that the cell width WC2 may be divided into equal portions by the gate lines 302. In other words, along the center lines 302a of the gate lines 302, the standard cell Cell-C1 and the standard cell Cell-C2 may be divided into portions having the same width. It is also noteworthy that the cell boundaries 304 are substantially along the center lines of the dummy gate lines 400, so that the dummy gate lines 400 of the standard cell Cell-C1 and the standard cell Cell-C2 are respectively divided into two half portions 400a and 400b by the cell boundaries 204, wherein the half portion 400a has a half width Wa, the half portion 400b has a half width Wb, and the half width Wa and the half width Wb are the same. According to the above limitations, it should be understood that the dummy gate line space SC2 and the dummy gate line space SC3 may be the same, and the distances between the cell boundaries 304 the same.

According to an embodiment of the present invention, the gate line width LC may be equal to the default gate line width L, the gate line width LA is equal to a sum of the default gate line width L and the first variable d1, and the gate line width LB is equal to a sum of the default gate line width L and the second variable d2.

The width of the dummy gate line 400 (the sum of the half width Wa and the half width Wb) may be equal to the default gate line width L, the gate line width LC, the gate line width LA, or the gate line width LB. For example, the width of the dummy gate line 400 may be equal to the sum of the default gate line width L and the first variable d1, that is, equal to the gate line width LA.

According to an embodiment of the present invention, in the step 12 of the method 10, the default gate line width L for generating the gate lines of the standard cells may be the minimum gate line width in compliance with the design rule specification for the integrated circuit, the default gate line pitch P may be the minimum pitch that the process resolution may achieve when the default gate line width L is the minimum gate line width. For example, according to an embodiment of the present invention, the parameters set in the step 12 of the method 10 may include a default gate line width L of 16 nm, a default gate line pitch P of 96 nm, a first variable d1 of 4 nm, and a second variable d2 of 8 nm. Accordingly, the standard cells Cell-A1, Cell-A2, Cell-B1, Cell-B2, Cell-C1, and Cell-C2 obtained after performing the step 14 and the step 16 may respectively include the dimensions as shown in Table-1.

TABLE 1

| Standard Cell | Default gate line pitch | Gate line width | Gate line space | Dummy gate line space | Dummy gate line space | Half width | Half width |
|---|---|---|---|---|---|---|---|
| Cell-A1 | P | LA | SA1 | SA2 | SA3 | Wa | Wb |
| Cell-A2 | 96 nm | 20 nm | 76 nm | 76 nm | 76 nm | 10 nm | 10 nm |
| Cell-B1 | P | LB | SB1 | SB2 | SB3 | Wa | Wb |
| Cell-B2 | 96 nm | 24 nm | 72 nm | 74 nm | 74 nm | 10 nm | 10 nm |
| Cell-C1 | P | LC | SC1 | SC2 | SC3 | Wa | Wb |
| Cell-C2 | 96 nm | 16 nm | 80 nm | 78 nm | 78 nm | 10 nm | 10 nm |

The specific dimensions shown in Table-1 are for the purpose of understanding of the present invention, and should not be taken as limitations to the present invention. In other embodiments, the values of the default gate line width L, the default gate line pitch P, the first variable d1, and the second variable d2 may be adjusted according to design needs. According to an embodiment of the present invention, the values of the default gate line width L, the default gate line pitch P, the first variable d1, and the second variable d2 are all even numbers to obtain an all on-grid layout pattern.

It is noteworthy that although the standard cells of the present invention have different gate line widths, all of the standard cells have the gate lines being arranged between the cell boundaries in such a way that the standard cells are divided into portions of the same width by the gate lines (more specifically, by the center line of the gate lines). Accordingly, the difference between the gate line spaces of any two of the standard cells is equal to the difference between gate line widths of the two standard cells. Furthermore, because the standard cells of the present invention have the same dummy gate lines, the difference between the dummy gate line spaces of any two of the standard cells is equal to ½ of the difference between gate line widths of the two standard cells.

For example, please refer to standard cell Cell-C1 and standard cell Cell-A1 shown in Table-1. The gate line width LC of the standard cell Cell-C1 is 16 nm, the gate line width LA of the standard cell Cell-A1 is 20 nm, and the difference between the gate line width LC and the gate line width LA is 4 nm (the first variable d1). The dummy gate line space SC2 of the standard cell Cell-C1 is 78 nm, the dummy gate line space SA2 of the standard cell Cell-A1 is 76 nm, and the difference between the dummy gate line space SC2 and the dummy gate line space SA2 is 2 nm, which is ½ of the first variable d1.

Please refer to standard cell Cell-C1 and standard cell Cell-B1 shown in Table-1. The gate line width LC of the standard cell Cell-C1 is 16 nm, the gate line width LB of the standard cell Cell-A1 is 24 nm, and the difference between the gate line width LC and the gate line width LB is 8 nm (the second variable d2). The dummy gate line space SC2 of the standard cell Cell-C1 is 78 nm, the dummy gate line space SB2 of the standard cell Cell-B1 is 74 nm, and the difference between the dummy gate line space SC2 and the dummy gate line space SB2 is 4 nm, which is ½ of the second variable d2.

Please refer back to FIG. 1. After obtaining the first standard cell and the second standard cell, step 18 of the method 10 is performed, including abutting the first standard cell and the second standard cell to produce an integrated circuit layout. According to an embodiment of the present invention, when the step 16 produce a first standard cell, a second standard cell, and a third standard cell, at least two of the first standard cell, the second standard cell, and the third standard cell may be used in step 18 to produce an integrated circuit layout.

As previously illustrated, the standard cells of the present invention have the following features. First, different standard cells have the same default gate line pitch. Second, the cell widths of different standard cells are all integral multiples of the default gate line pitch. Third, the gate lines of each of the standard cells are equally spaced and arranged between the cell boundaries in a way that the cell width of each of the standard cells is divided into equal portions by the gate lines. Fourth, different standard cells have the same dummy gate lines, and the cell boundaries of each of the standard cells are along the center lines of the dummy gate lines, respectively.

Based on the features of the standard cells, the layout of the integrated circuit obtained by abutting the standard cells may have the following features. First, when the cell boundaries of the standard cells abutting along the first direction D1 are overlapped, the dummy gate lines of the standard cells on the overlapped cell boundaries may be completely overlapped with each other. Furthermore, the gate lines, dummy gate lines, and cell boundaries of the standard cells abutting along the second direction D2 are aligned along the second direction D2. Additionally, when the active region patterns of the standard cells have the same active region width and the same active region pitch, the active region patterns of the standard cells may be aligned along the first direction D1. For the ease of understanding, the features of the layout of the integrated circuit of the present invention will be illustrated according to the embodiments shown in FIG. 5, FIG. 6, FIG. 7 and FIG. 8, respectively.

Figure 5:
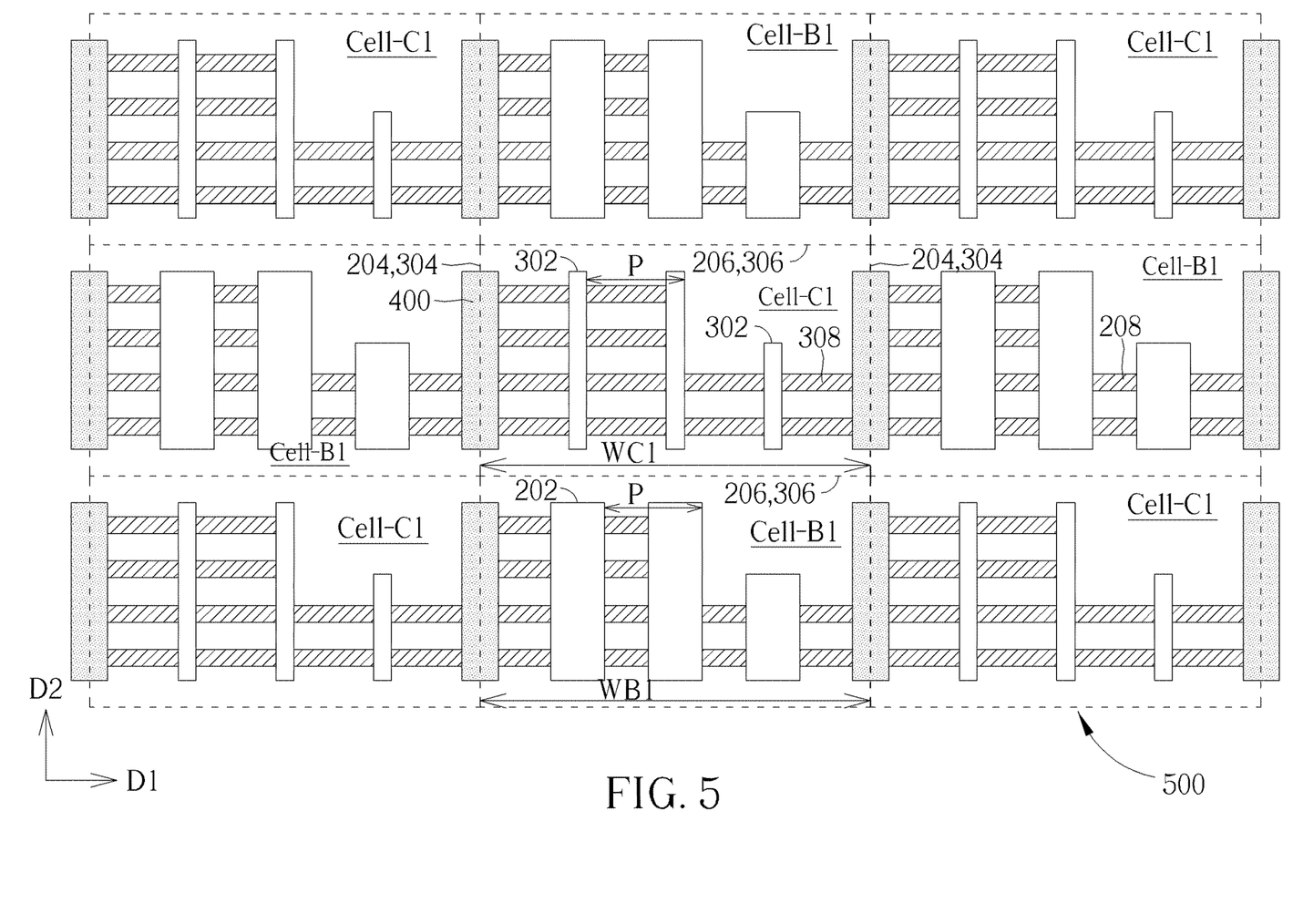
FIG. 5 to FIG. 8 are schematic drawings showing some exemplary layouts of integrated circuits according to some embodiment of the present invention.

Please refer to FIG. 5, which is a schematic plan view of an integrated circuit layout 500 according to an embodiment of the present invention. The integrated circuit layout 500 includes a plurality of standard cell Cell-C1 and standard cell Cell-B1 that are mixed and abutted along the first direction D1 and the second direction D2. The standard cell Cell-C1 and the standard cell Cell-B1 abutting along the first direction D1 have the cell boundaries 304, 204 overlapped with each other and share a same dummy gate line 400. The standard cell Cell-C1 and the standard cell Cell-B1 abutting along the second direction D2 have the cell boundaries 306, 206 overlapped with each other. Each standard cell Cell-C1 has a plurality of gate lines 302 arranged along the first direction D1 and between the cell boundaries 304. The gate lines 302 of the standard cell Cell-C1 have the gate line width LC and are distanced from each other by the default gate line pitch P (as shown in the upper portion of FIG. 4). Each standard cell Cell-B1 has a plurality of gate lines 202 arranged along the first direction D1 and between the cell boundaries 204. The gate lines 202 of the standard cell Cell-B1 have the gate line width LB and are distanced from each other by the default gate line pitch P (as shown in the upper portion of FIG. 3). The gate line width LC and the gate line width LB are different by a variable (for example, the second variable d2). The standard cell Cell-C1 has a cell width WC1 between the cell boundaries 304, the standard cell Cell-B1 has a cell width WB1 between the cell boundaries 204, and the cell width WC1 and the cell width WB1 are the same, and are integral multiples of the default gate line pitch P. In the embodiment shown in FIG. 5, the gate lines 302 and the gate lines 202 are aligned, and the cell boundaries 304 and the cell boundaries 204 are aligned along the second direction D2.

Figure 6:
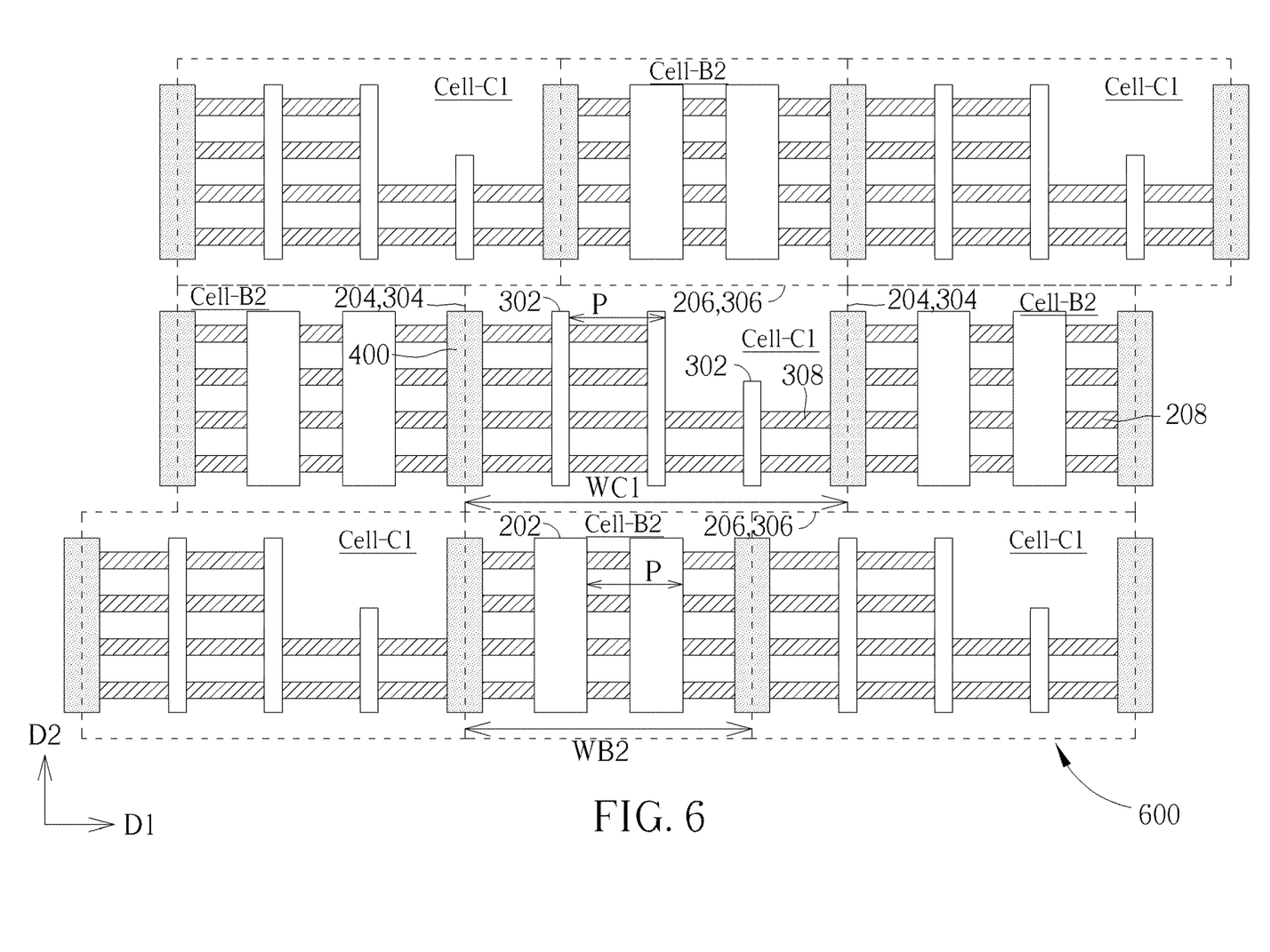

Please refer to FIG. 6, which is a schematic plan view of an integrated circuit layout 600 according to an embodiment of the present invention. The integrated circuit layout 600 includes a plurality of standard cell Cell-C1 and standard cell Cell-B2 that are mixed and abutted along the first direction D1 and the second direction D2. The standard cell Cell-C1 and the standard cell Cell-B2 abutting along the first direction D1 have the cell boundaries 304, 204 overlapped with each other and share a same dummy gate line 400. The standard cell Cell-C1 and the standard cell Cell-B2 abutting along the second direction D2 have the cell boundaries 306, 206 overlapped with each other. Each standard cell Cell-C1 has a plurality of gate lines 302 arranged along the first direction D1 and between the cell boundaries 304. The gate lines 302 of the standard cell Cell-C1 have the gate line width LC and are distanced from each other by the default gate line pitch P (as shown in the upper portion of FIG. 4). Each standard cell Cell-B2 has a plurality of gate lines 202 arranged along the first direction D1 and between the cell boundaries 204. The gate lines 202 of the standard cell Cell-B1 have the gate line width LB and are distanced from each other by the default gate line pitch P (as shown in the lower portion of FIG. 3). The gate line width LC and the gate line width LB are different by a variable (for example, the second variable d2). The standard cell Cell-C1 has a cell width WC1 between the cell boundaries 304, the standard cell Cell-B2 has a cell width WB1 between the cell boundaries 204, and the cell width WC1 and the cell width WB1 are different, but both are integral multiples of the default gate line pitch P. In the embodiment shown in FIG. 6, the gate lines 202 are aligned to a portion of the gate lines 302, the cell boundaries 204 are respectively aligned to a gate line 302 or one of the cell boundaries 304, and a portion of the dummy gate lines 400 are aligned to the gate lines 202 or the gate lines 302 along the second direction D2.

Figure 7:
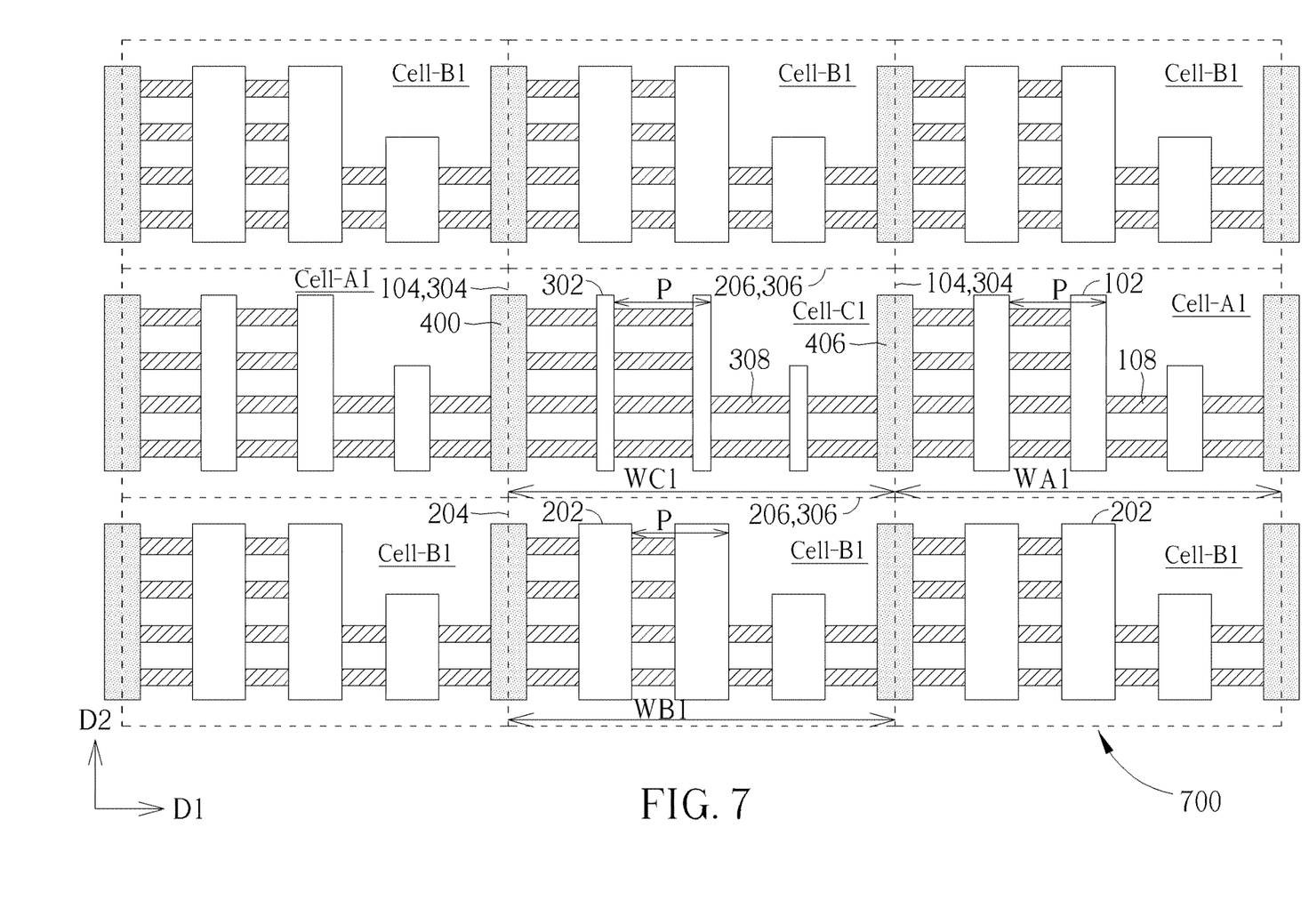

Please refer to FIG. 7, which is a schematic plan view of an integrated circuit layout 700 according to an embodiment of the present invention. Similar to embodiment shown in FIG. 5, the integrated circuit layout 700 includes standard cells having the same cell width, the same default gate line pitch (such as the default gate line pitch P), but different gate line widths. The difference between the embodiments shown in FIG. 5 and FIG. 7 is that, the integrated circuit layout 700 includes three types of standard cells having different gate line widths, such as the standard cells Cell-C1, Cell-B1, and Cell-A1. As shown in FIG. 7, the cell boundaries 304, 204 and 104 of different standard cells are aligned along the second direction D2, The gate lines 302, 202, 102, and the dummy gate lines 400 are also aligned along the second direction D2.

Figure 8:
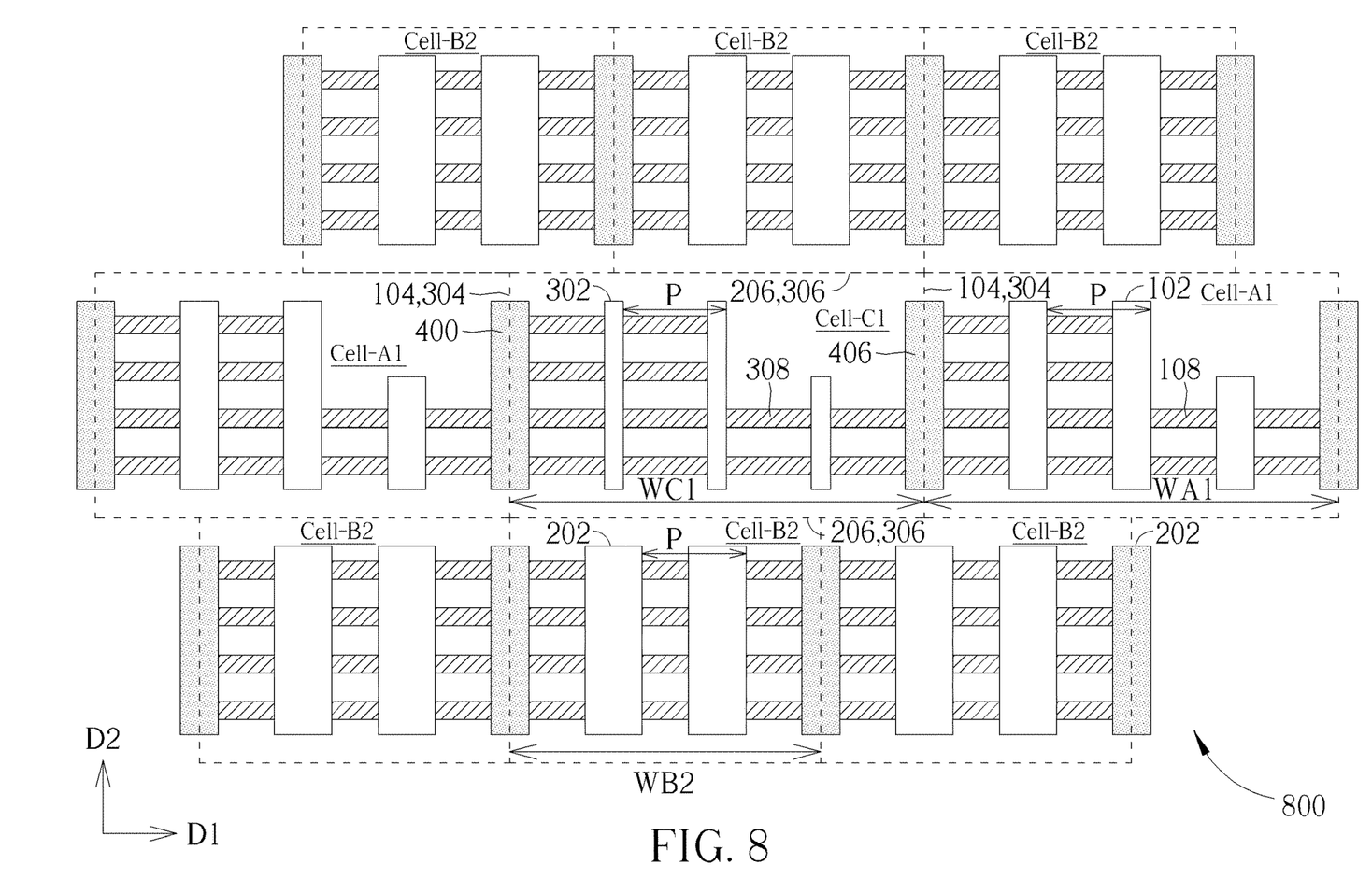

Please refer to FIG. 8, which is a schematic plan view of an integrated circuit layout 800 according to an embodiment of the present invention. Similar to embodiment shown in FIG. 7, the integrated circuit layout 800 includes three types of standard cells having the same default gate line pitch (such as the default gate line pitch P) but different gate line widths. The difference between the embodiments shown in FIG. 7 and FIG. 8 is that, at least two of the three types of standard cells have different cell widths. For example, as shown in FIG. 8, the integrated circuit layout 800 includes standard cells Cell-C1, Cell-B2, and Cell-A1, wherein a cell width WB2 of the standard cells Cell-B2 is different from the cell width WC1 of the standard cells Cell-C1 and the cell width WA1 of the standard cells Cell-A1. Along the second direction D2, some of the cell boundaries 304, 204, 104 may be non-aligned, some of the gate lines 302 and the gate lines 202 may be aligned, some of the gate lines 102 and the gate lines 202 may be aligned, the cell boundaries 204 may be aligned to one of the gate lines 302 or one of the cell boundaries 304, some of the dummy gate lines 400 may be aligned to the gate lines 202, the gate lines 302, and or the gate lines 102.

After obtaining the integrated circuit layout (after the step 18 of the method 10), layout corrections such as optical proximity correction (OPC) may be performed to modify the layout patterns, and then the corrected layout patterns may be output from the computer system to a set of photomasks for fabricating the integrated circuit on a semiconductor substrate. For example, the patterns of the gate lines 102, 202, 302 may be used to form gate structures (for example, polysilicon gate structures or metal gate structures) on the semiconductor substrate. The patterns of the active region patterns 108, 208, 308 may be used to form the active regions (for example, fin-type active regions) on the semiconductor substrate. The dummy gate lines 400 may be used to form dummy gate structures on the semiconductor substrate, such as polysilicon dummy gate structures or dummy metal gate structures. It should be understood that the integrated circuit layout provided by the present invention may include other patterns such as contact patterns, dummy active region patterns, ion implanting patterns, which are not shown in the drawings for the sake of simplicity.

In conclusion, the integrated circuit layout provided by the present invention includes standard cells having a same gate line pitch but different gate line widths. More important, the widths of the standard cells are integral multiples of the gate line pitch, and the gate lines are arranged along a row direction (the first direction D1) between the cell boundaries of the standard cells in a way that the cell widths of the standard cells may be divided into equal portions by the gate lines. In this way, when the standard cells are mixed arranged along the row direction (the first direction D1) and/or the column direction (the second direction D2) to form the integrated circuit layout, the gate lines and the dummy gate lines may be aligned along the column direction, allowing a higher degree of pattern regularity. Furthermore, by placing the dummy gate lines in a way that the cell boundaries are along the center lines of the dummy gate lines, the adjacent standard cells arranged along the row direction (the first direction D1) may share a same dummy gate line while maintaining the same gate line pitch without the need to adjust the patterns of the standard cells or unused layout areas generated between the standard cells, so that the layout area of the integrated circuit may be fully utilized. Overall, the layout of the integrated circuit provided by the present invention may have a neat and predictable pattern arrangement, which may reduce the burden of automated circuit layout process, and also save the time for layout corrections such as the optical proximity correction (OPC) performed after delivering the designed circuit layout to the foundry (tape-out). Furthermore, during the manufacturing process, the neat layout patterns of the present invention may provide a larger process window to form desired patterns on the wafer.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An integrated circuit layout, comprising:
   a first standard cell, comprising:
      two first vertical cell boundaries arranged in parallel in a first direction and extending along a second direction, wherein the first direction and the second direction are perpendicular;
      two first lateral cell boundaries arranged in parallel in the second direction and extending along the first direction;
      a plurality of first active region patterns between the two first vertical cell boundaries and extending along the first direction and arranged in parallel along the second direction, wherein the first active regions have different lengths along the first direction; and
      a plurality of first gate lines arranged along the first direction and on the plurality of first active region patterns, wherein the first gate lines respectively comprise a first gate line width and are distanced from each other by a default gate line pitch;
   a second standard cell, comprising:
      two second vertical cell boundaries arranged in parallel in the first direction and extending along the second direction;
      two second lateral cell boundaries arranged in parallel in the second direction and extending along the first direction;
      a plurality of second active region patterns between the two second vertical cell boundaries and extending along the first direction and arranged in parallel along the second direction; and
      a plurality of second gate lines and arranged along the first direction on the plurality of second active region patterns, wherein the second standard cell is abutted to a side of the first standard cell by overlapping one of the two first lateral cell boundaries and one of the two second lateral cell boundaries, the second gate lines respectively comprise a second gate line width and are distanced from each other by the default gate line pitch, the first gate line width and the second gate line width are different, a first cell width between the two first vertical cell boundaries and a second cell width between the two second vertical cell boundaries are integral multiples of the default gate line pitch, and at least some of the second gate lines and at least some of the first gate lines are aligned along the second direction; and
   a plurality of dummy gate lines respectively overlapping the first vertical cell boundaries and the second vertical cell boundaries, wherein at least one of the first active region patterns has one distal end overlapped by one of the dummy gate lines and another distal end overlapped by one of the first gate lines.

2. The integrated circuit layout according to claim 1, wherein the two second vertical cell boundaries are respectively aligned to one of the first gate lines or one of the two first vertical cell boundaries.

3. The integrated circuit layout according to claim 1, wherein the two first vertical cell boundaries are equally distanced from the first gate lines, and the two second vertical cell boundaries are equally distanced from the second gate lines.

4. The integrated circuit layout according to claim 1, wherein the dummy gate lines are respectively aligned to one of the first gate lines, one of the second gate lines, or one of the dummy gate lines along the second direction.

5. The integrated circuit layout according to claim 1, wherein each of the dummy gate lines is divided into two equal portions by the first vertical cell boundaries or the second vertical cell boundaries.

6. The integrated circuit layout according to claim 1, wherein a dummy gate line width of the dummy gate lines equals to the first gate line width or the second gate line width.

7. The integrated circuit layout according to claim 1, wherein a dummy gate line width of the dummy gate lines is different from the first gate line width and the second gate line width.

8. The integrated circuit layout according to claim 1, wherein:
   the second gate line width equals to a sum of the first gate line width and a variable;
   the first gate lines comprise a first gate line space between edges of the first gate lines, the second gate lines comprise a second gate line space between the edges of the second gate lines, wherein the second gate line space is smaller than the first gate line space by the variable; and
   an edge of the dummy gate lines and an edge of the first gate lines adjacent to the edge of the dummy gate lines comprise a first dummy gate line space, another edge of the dummy gate lines and an edge of the second gate lines adjacent to the another edge of the dummy gate lines comprise a second dummy gate line space, wherein the second dummy gate line space is smaller than the first dummy gate line space by 0.5 of the variable.

9. The integrated circuit layout according to claim 1, wherein distal ends of the first active region patterns and the second active region patterns are overlapped by the first gate lines, the second gate lines, or the dummy gate lines.

10. The integrated circuit layout according to claim 1, wherein the first active region patterns and the second active region patterns have a same width in the second direction.

11. The integrated circuit layout according to claim 1, further comprising:
    a third standard cell, comprising:
       two third vertical cell boundaries arranged in parallel in the first direction and extending along the second direction;
       two third lateral cell boundaries arranged in parallel in the second direction and extending along the first direction;
       a plurality of third active region patterns between the two third vertical cell boundaries and extending along the first direction and arranged in parallel along the second direction; and
       a plurality of third gate lines arranged along the first direction on the plurality of third active region patterns, wherein the third standard cell is abutted to another side of the first standard cell by overlapping one of the two first vertical cell boundaries and one of the two third vertical cell boundaries, the third gate lines respectively comprise a third gate line width and are distanced from each other by the default gate line pitch, the first gate line width and the third gate line width are different, a third cell width between the two third vertical cell boundaries are integral multiples of the default gate line pitch.

12. The integrated circuit layout according to claim 11, wherein the dummy gate lines respectively overlap the first vertical cell boundaries, the second vertical cell boundaries, and the third vertical cell boundaries, and each of the dummy gate lines is divided into two equal portions by the first vertical cell boundaries, the second vertical cell boundaries, or the third vertical cell boundaries.

13. The integrated circuit layout according to claim 11, wherein the first active region patterns and the third active region patterns are aligned along the first direction.

14. The integrated circuit layout according to claim 11, wherein the first active region patterns and the third active region patterns have a same width in the second direction.

15. The integrated circuit layout according to claim 11, wherein:
the third gate line width equals to a sum of the first gate line width and a variable;
the first gate lines comprise a first gate line space between edges of the first gate lines, the third gate lines comprise a third gate line space between the edges of the third gate lines, wherein the third gate line space is smaller than the first gate line space by the variable; and
an edge of the dummy gate line and an edge of the first gate lines adjacent to the edge of the dummy gate lines comprise a first dummy gate line space, another edge of the dummy gate line and an edge of the third gate lines adjacent to the another edge of the dummy gate lines comprise a third dummy gate line space, wherein the third dummy gate line space is smaller than the first dummy gate line space by 0.5 of the variable.

16. The integrated circuit layout according to claim 11, wherein the second gate line width and the third gate line width are the same.

17. The integrated circuit layout according to claim 11, wherein the second gate line width and the third gate line width are different.

* * * * *